2,986,520
HYDROPHOBIC OLEOPHILIC ORGANO CLAY-THICKENED LUBRICATING OIL

Peter K. Freeman, State College, Pa., and Walter H. Peterson, Point Richmond, Calif., assignors to Shell Oil Company, a corporation of Delaware No Drawing. Filed July 28, 1959, Ser. No. 829,968

9 Claims. (Cl. 252—49.6)

This invention relates to lubricants and more particularly to the bodied types including greases.

In the production of bodied lubricants, it is customary to prepare solutions or dispersions of soaps in lubricating oils, the function of the soaps being to body up the oils to grease consistency. Soaps commonly used for this purpose are the metal salts of long carbon chain saturated and unsaturated fatty acids, as for example, sodium stearate, magnesium stearate, aluminum palmitate, etc., although salts of carbocyclic acids, such as lead naphthenate, are also useful. It is commonly observed that lubricants consisting of these soap-in-oil dispersions have a relatively high thermal coefficient of viscosity and that at temperatures often encountered in machinery under normal operating conditions these greases become fluid, resulting in loss of the lubricant and damage to the machinery. This is to a considerable extent a function of the melting point of the soap. Thus, the magnesium, zinc and aluminum soaps are not suitable for high temperature applications because of their low melting points.

It is known that a clay mineral such as montmorillonite, originally exhibiting a substantial base-exchange capacity, can be reacted with an organic compound such as an organic ammonium compound to replace the clay cation by an organo ammonium cation to form a water-repellent product which is called "onium clay."

Certain of the "onium clays" will gel mineral lubricants to greases and they do not have any melting point like the soap gelled greases. But they have limited thermal stability which may be due in part to the tendency of the "onium clay" to be oxidized at high temperatures.

Another important aspect of lubrication comprises the ability to withstand alteration in physical properties in the presence of ionizing radiation, such as in nuclear reactors and the like. Most lubricants and gelling agents fail under such conditions. For example, the soap base greases usually liquefy while greases containing silicone oils normally first liquefy, then resinify and solidify in the presence of radiation.

One of the objects of the present invention is to provide a novel bodied lubricant. Another object is to provide such a lubricant having a low thermal coefficient of viscosity. A further object of the invention is to provide greases having good consistency at low temperatures which have an extremely high dropping point. A special object of the present invention is to provide greases having exceptionally high thermal stability and oxidation stability as well as high resistance to alteration in the presence of ionizing radiation. Further objects will become apparent from the detailed description of the invention. It is to be understood, however, that the invention is susceptible of various embodiments within the scope thereof.

Now, in accordance with the present invention, a bodied lubricant is provided comprising an organic lubricating liquid and an organophilic hydrophobic organo metallo clay in which exchangeable inorganic cations of the original clay have been replaced by cations derived by oxidation of an organo metallic compound having the general formula A—M—B in which A and B are independently selected and have aromatic or cyclomatic hydrocarbon nuclei bonded directly to a transition element M, the cations being of the type capable of and replacing the inorganic cations to an extent sufficient to form with the clay an oleophilic organo clay. The cations formed by oxidation may be represented as $[A-M-B]^{+b}$, wherein $b$ is a positive charge varying from 1 to 3. The bodied lubricant may be grease-like in nature or may be a relatively liquid lubricant in which the organo metallo clay performs the function of a thickener therefor, thus modifying the viscosity of the oil and its viscosity-temperature characteristics. One of the features of the present invention is the discovery that it is unnecessary for the present organo metallo clays to be swellable in organic media although some of the species may exhibit swelling properties. They are highly efficient grease-forming agents whether or not they swell in the lubricating oil or in other organic solvents. It is preferred, however, that relatively large organic radicals be attached to the transition metal as more fully described hereinafter since this enables a "direct transfer" step to be utilized in the manufacture of lubricants, as described more fully hereinafter.

The clays which are useful as starting materials for making the modified clay are those exhibiting substantial base-exchange properties, and particularly those exhibiting comparatively high base-exchange properties and containing cations capable of more or less ready replacement. The clays particularly contemplated by the invention include the montmorillonites viz., sodium, potassium, lithium and other bentonites, particularly of the Wyoming type; magnesium bentonite (sometimes called hectorite) and saponite; also nontronite and attapulgite, particularly that of the Georgia-Florida type. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides. Bentonites which are particularly useful are the swelling bentonites of the Wyoming type and the swelling magnesium bentonites of the hectorite type.

The base-exchange capacities of the various clays enumerated run from about 25 to about 100 as milliequivalents of exchangeable base per 100 grams of clay. The montmorillonites have comparatively high base-exchange capacities, viz., 60–100. Attapulgite has substantial base-exchange capacity, viz., 25–35. Generally, the clays of higher base-exchange capacities are particularly useful where high exchange of an organic base for the cation of the clay is desired.

The exchangeable inorganic cations of the clay are replaced entirely or in part by cationic radicals of the organo metallic compounds. The extent of replacement will depend much upon the character of the organo groups of the organo metallo cations. The extent of replacement will depend also upon the base-exchange capacity of the clays. Normally, for the optimum grease-forming ability it is preferred that the organo metallo clay formed by this reaction contain from about 5 to about 25% by weight of the organo metallo cations. Replacement of the replaceable inorganic ions by such cations is readily effected by one of two methods: (1) The organo metallo cations are preformed and added at any desirable temperature from room temperature to about 250° F. to an aqueous dispersion of the clay; or (2) an A—M—B organo metallo compound is adsorbed upon a clay surface and the organo metallo compound is converted to an oxidized (cationic) form which in turn replaces repleaceable inorganic cations of clay to form an organo metallo clay. The former process is preferred since the medium is not subjected to the oxidizing action of the oxidizing agent.

The metal "M" of the organo metallic compounds (from which cations are to be formed by oxidation) is restricted to transition elements other than manganese. This includes those elements that have from one to ten electrons in their $d$ orbitals, i.e., those in which the penultimate shell is in the process of expanding from eight electrons to eighteen. Thus are included in the first long period Ti, V, Cr, Fe, Co and Ni, in the second long period Zr, Nb, Mo, Tc, Ru, Rh and Pd in the third Hf, Ta, W, Re, Os, Ir and Pt.

While in some instances the radicals A and B may be aryl or alkaryl, the cyclomatic radicals are preferred, that is, an organic radical which is a cyclopentadienyl type radical, a radical containing the cyclopentadienyl moiety.

The cyclomatic radical is defined as one having the general configuration $(CR)_5$, wherein each R is hydrogen or a hydrocarbon radical. In the latter case two R's on adjacent carbon atoms may be joined to form a divalent hydrocarbon radical combining with the two carbons to form a cyclic group. The organic groups forming the non-metallic portions of the organo metallic compounds to be oxidized and then reacted with clay include especially the radicals given in detail in Brown et al. Patents U.S. 2,818,416 and U.S. 2,818,417.

Typical species from which the cation radicals are to be formed for reaction with clays include the following:

Iron compounds:
    Bis(cyclopentadienyl)iron (ferrocene)
    Diacetylferrocene
    Bis($\beta$-chloropropionyl)ferrocene
    Diacryloylferrocene
    Diethylferrocene
    Di-n-propylferrocene
    Di-octylferrocene
    Di-octadecylferrocene
    Di-tetradecylferrocene
    Di-dodecylferrocene
    Tetrahexylferrocene
    Tetradodecylferrocene
    (Octylcyclopentadienyl)(octadecylcyclopentadienyl)iron
    (Cyclopentadienyl)(dioctadecylcyclopentadienyl)iron
    Bis(1,3,4-tripropylcyclopentadienyl)iron Nickel compounds:
    Bis(cyclopentadienyl)nickel
    Bis(butylcyclopentadienyl)nickel
    Bis(isopentylcyclopentadienyl)nickel
    Bis(n-heptylcyclopentadienyl)nickel
    Bis(nonylcyclopentadienyl)nickel
    Bis(indenyl)nickel
    Bis(2-ethyl-3-phenyl-4,5,6,7-tetrahydroindenyl)nickel Other cyclomatic compounds:
    Bis(dioctylcyclopentadienyl)ruthenium
    Bis(cyclopentadienyl)cobalt While the cyclomatic organo metallo compounds are those preferred for use in the present invention, diaromatic metallic compounds (including alkaromatic) may be utilized from which cations can be prepared which are suitable for reaction with clays. Thus, these univalent aromatics can be, for example, benzene, naphthalene, anthracene and the like, including such aromatics as indene, acenaphthene, fluorene, phenanthrene, naphthacene, chrysene, pyrene, triphenylene, and the like. Moreover, these aromatics can include toluene, xylene, cumene, mesitylene, ethyl benzene and the like.

Diaryl metal compounds:
    Bis(biphenyl)chromium
    Bis(mesitylene)chromium
    Bis(octadecylbenzene)chromium
    Dibenzene cobalt The type of clay mineral to be used may vary with the intended use. For optimum gelling properties, it is best to use a montmorillonite (preferably hectorite) which exhibits good gelling properties. However, some non-swelling clays when converted to the organophilic clays described here will be suitable for thickening the lubricating oils as well as do the organophilic clays prepared from high base-exchange clays.

It is to be understood that when reference is made to organo metallic compounds, such as ferrocene or other cyclomatic metallic compounds, before reacting with clay by base-exchange the organo metallic compound will be converted to the cationic form preferably by oxidation, such as with air, chlorine or silver salts as is well known in the art.

In the preparation of thickened lubricants and greases from these materials various methods may be employed. If it is desired to prepare a grease free from abrasive impurities, it may be advantageous to start with a dilute aqueous dispersion of the clay and allow a gangue to settle out or to remove the impurities by centrifuging. By the latter method, it is also possible to fractionate a clay into desired particle size fractions. Thereafter, the purified clay dispersion is reacted with the oxidized salt form of the organo metallic compounds. If the latter contains only a minor amount (or none) of organo radicals (directly attached to the aromatic or cyclomatic rings) having less than 12 carbon atoms each, it may be necessary to filter the flocculated or organo metallo clay so formed, dry and grind it and thereafter mix it with an organic lubricating liquid.

However, if the organo metallic compound contains organic side chains having a total of at least 12 carbon atoms directly attached to the aromatic or cyclomatic rings, then a more economic procedure can be followed. In this case, as shown in the working examples, it is possible to disperse the clay in water, add an organic lubricating liquid, such as lubricating oil, together with the oxidized, salt form of the organo metallic compound, whereby an organo metallo clay is formed which has the ability to transfer from the aqueous dispersion into the organic lubricating liquid. A curd is thereby formed which is readily separated from most of the water, such as by passing the reaction mixture over a screen through which the water passes while the curd is retained on it and can be passed over it to a drier where residual amounts of water are removed, preferably at elevated temperatures provided by steam jacketing of the drier. This can be done either at atmospheric pressure or under reduced pressure. A preferred form of apparatus for this comprises an agitated thin film drier wherein the dewatered curd passes to the interior of a drum where it is spread over the interior surfaces thereof by means of rapidly rotating paddles. It is progressed through the drier with only a few seconds residence time, at the end of which all of the water is removed. Under these circumstances, greases exhibiting the highest "yield" are obtained.

The thickened lubricants of the present invention may be modified by the presence of other thickening or gelling agents, such as clays, onium clays, clays waterproofed with adsorbed amines, indogen dyes, indanthrene dyes, aryl ureas, soaps, silica gel, sulfonates and the like.

The lubricating oils include any of the well-known hydrophobic lubricants, such as mineral oils, synthetic esters, such as bis(2-ethyl-hexyl)sebacate, silicones, such as dimethyl silicone or methyl phenyl silicone, pentaerythritol esters, such as $C_{10-14}$ tetra-alkyl pentaerythritol esters, phosphates, such as trioctyl phosphate, silicates, such as tetraoctyl silicate, polyphenyl ethers, such as bis(m-phenoxyphenyl)ether and combinations of the same.

The following examples illustrate the present invention.

EXAMPLE I

Ferricinium sulfate solution was prepared by oxidation of 4.46 parts by weight of ferrocene with silver sulfate, followed by subsequent removal of the silver and excess of ferrocene by filtration. The solution of ferricinium sulfate was added to 1,000 parts by weight of a 2% aqueous slurry of hectorite at room temperature with stirring. The flocculated organo clay thus produced was filtered and washed with water. The filter cake was added to a mixture of 200 parts by weight of a methyl phenyl silicone oil designated as Dow-Corning DC–550 Fluid, and 6,000 parts by weight of isopropyl alcohol. The alcohol and water were evaporated by allowing the mixture to stand in a steam cabinet at approximately 300° F. for about 12 hours. The resulting grease components were then homogenized on a paint mill during which 171 parts by weight of methyl phenyl silicone oil were added to produce a grease structure. The properties of the grease so produced are given in Table 1 below.

EXAMPLE II

A second organo clay was produced by use of the procedure of Example I except that the organo metallic compound was n-butyl ferrocene. The properties of the grease so produced are given in Table 1 below.

EXAMPLE III

A grease was produced similarly but using di-n-propyl ferrocene, the properties of the grease being given in Table 1 below.

Unworked penetration _____ 230
Worked penetration _____ 296
Water absorption _____percent__ 25
Thin film evaporation test, 24 hours at 450° F.
                                                             percent loss__ 17.4

EXAMPLE VI

Bis-biphenyl chromium (I) iodide (1.95 parts by weight) was mixed with 250 parts by weight of a 2% hectorite clay slurry in a Waring Blendor at approximately room temperature. The organo clay so formed was then used as the gelling agent for methyl phenyl silicone oil, the process employed being that described in Example I.

EXAMPLE VII

The process of Example I was repeated, utilizing bentonite clay instead of hectorite, the organo metallic compound being oxidized di-n-propyl ferrocene. This grease had an unworked penetration of 200, a worked 60 penetration of 213, water absorption of 65% and a thin film evaporation test (24 hours at 450° F.) of 19.8%.

EXAMPLE VIII

Octadecyl ferrocene was oxidized with chlorine gas to produce the corresponding octadecyl ferricinium ion. This was reacted with hectorite clay as described in Ex-

*Table 1*

| Grease | Composition, Percent w. | Un-worked Pen | Worked Pen | Water Absorption, Percent w. | Thin Film Test, 450° F. for 24 hr. | |
|---|---|---|---|---|---|---|
| | | | | | Loss, Percent w. | Appearance |
| Ferrocene | 0.4 Ferrocene<br>5.1 Hectorite<br>94.5 DC-550 | 275 | 294 | 30 | 12 | Good. |
| n-butylferrocene | 0.6 n-butylferrocene<br>6.7 Hectorite<br>92.7 DC-550 | 285 | 313 | 35 | 10 | Good. |
| Di-n-propylferrocene | 0.7 Di-n-propylferrocene<br>6.2 Hectorite<br>93.1 DC-550 | 227 | 249 | 35 | 14 | Good. |

EXAMPLE IV

Ferrocene was alkylated with hexyl bromide and aluminum chloride and 28.2 parts by weight of the product were oxidized with chlorine to give a water-soluble green salt. This solution was used to form an organo clay with 300 parts by weight of a 2% slurry of hectorite. The organo clay was filtered and washed with water. It was then combined with 60 parts by weight of methyl phenyl silicone oil and the water was driven off by heating on a steam hot plate. The resulting grease was homogenized on a paint mill and had the following properties:

Unworked penetration _____ 131
Worked penetration _____ 140
Water absorption _____percent__ 45
Thin film evaporation, 24 hours at 450° F. __do____ 35

EXAMPLE V

Dimesitylene chromium (I) ions were produced by the process of E. O. Fischer et al. (Zeit. für anorg. u. allgemeine chemie 286, 146) (1956). A solution, containing dimesitylene chromium (I), derived by oxidation of 46 parts by weight of the dimesitylene chromium was added to 500 parts by weight of 2% hectorite aqueous slurry. The organo clay so formed was filtered and washed with water. A grease was prepared from the organo clay by the method described in Example I; it had the following properties:

ample IV in the presence of water. Upon addition of methyl phenyl silicone oil and agitating, the organo clay associated with the oil and the major proportion of separated water was removed by decantation. Dehydration was completed by removing residual water by distillation, after which the organo clay and oil were homogenized to form a grease.

EXAMPLE IX

A grease composition can be prepared, utilizing 8% by weight of octadecyl ferricinium clay, milled into a bright stock mineral lubricating oil. Such greases exhibit excellent stability even when exposed to ionizing radiation.

We claim as our invention:

1. A bodied lubricant comprising a major proportion of an organic lubricating oil having colloidally dispersed therein in an amount sufficient to thicken the oil a clay originally exhibiting a base-exchange capacity of at least 25 in which exchangeable inorganic cations have been exchanged by oxidized organo metallic compound cations, said compound before oxidation having the general formula $$A-M-B$$

wherein A and B are hydrocarbon nuclei of the group consisting of aromatic nuclei and cyclomatic nuclei bonded directly to the transition metal M, said cations being of a type capable of and replacing inorganic cations to an extent sufficient to form with the clay a hydrophobic oleophilic organo clay.

2. A bodied lubricant composition according to claim 1 wherein the transition metal M is a metal from group VIII of the periodic table.

3. A bodied lubricant comprising a major proportion of an organic lubricating oil having colloidally dispersed therein in an amount sufficient to thicken the oil a clay originally exhibiting a base-exchange capacity of 25-100 in which exchangeable inorganic cations have been exchanged by oxidized organo metallic compound cations, said compound before oxidation having the general formula

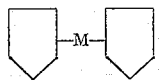

wherein —M— is a transition metal radical and

represents a cyclomatic hydrocarbon radical directly attached thereto, said cations being of a type capable of and replacing inorganic cations to an extent sufficient to form with the clay a hydrophobic oleophilic organo clay.

4. A bodied lubricant comprising a major proportion of an organic lubricating oil having colloidally dispersed therein in an amount sufficient to thicken the oil a clay originally exhibiting a base exchange capacity of about 25-100 in which exchangeable inorganic cations have been exchanged by oxidized organo metallic compound cations, said compound before oxidation having the general formula Ar—M—Ar wherein —M— is a transition metal radical and Ar— is an organic radical having an aromatic nucleus directly bonded to the transition metal, said cations being of a type capable of and replacing inorganic cations to an extent sufficient to form with the clay a hydrophobic oleophilic organo clay.

5. A bodied lubricant comprising a major proportion of a mineral lubricating oil having colloidally dispersed therein in an amount sufficient to thicken the oil a montmorillonite clay in which exchangeable inorganic cations have been replaced by bis(alkylcyclopentadienyl)iron (III) cations, said cations being of a type capable of and replacing inorganic cations to an extent sufficient to form with the clay a hydrophobic oleophilic organo clay.

6. A bodied lubricant comprising a major proportion of an organic lubricating oil having colloidally dispersed therein in an amount sufficient to thicken the oil hectorite clay wherein exchangeable inorganic cations have been replaced by bis($C_{14-20}$ alkylcyclopentadienyl)iron (III) cations, said cations being of a type capable of and replacing inorganic cations to an extent sufficient to form with the clay a hydrophobic oleophilic organo clay.

7. A bodied lubricant comprising a major proportion of a silicone lubricating oil having colloidally dispersed therein in an amount sufficient to thicken the oil hectorite clay wherein exchangeable inorganic cations have been replaced by cations of bis($C_{14-20}$ alkylcyclopentadienyl)-iron (III) cations, said cations being of a type capable of and replacing inorganic cations to an extent sufficient to form with the clay a hydrophobic oleophilic organo clay.

8. A grease composition consisting essentially of a major proportion of a methyl phenyl silicone lubricating oil having colloidally dispersed therein 2–30% by weight of a montmorillonite clay in which exchangeable inorganic cations have been replaced by bis(octadecylcyclopentadienyl)iron (III) cations to form an organo clay containing 5–25% by weight of the replacing iron cations.

9. A grease composition consisting essentially of a major proportion of a silicone lubricating oil having colloidally dispersed therein 2–30% by weight of an organophilic montmorillonite clay in which exchangeable inorganic cations have been replaced by 5–25% by weight of bis(mesitylene)chromium (I) cations.

References Cited in the file of this patent
UNITED STATES PATENTS

| | | |
|---|---|---|
| 2,763,613 | Scott et al. | Sept. 18, 1956 |
| 2,763,617 | Scott et al. | Sept. 18, 1956 |
| 2,839,552 | Shapiro et al. | June 17, 1958 |
| 2,859,234 | Clem | Nov. 4, 1958 |
| 2,879,229 | Stratton | Mar. 24, 1959 |